United States Patent
Kamiya et al.

(10) Patent No.: US 6,631,318 B2
(45) Date of Patent: Oct. 7, 2003

(54) CONTROL DEVICE APPLIED IN A SYNCHROMESH-TYPE TRANSMISSION

(75) Inventors: Mitsutoshi Kamiya, Kariya (JP); Yoshiyuki Aoyama, Nishio (JP); Takeshige Miyazaki, Anjo (JP); Ryuji Choshi, Aichi-ken (JP); Yoshihiro Ichikawa, Gifu (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/964,541

(22) Filed: Sep. 28, 2001

(65) Prior Publication Data
US 2002/0040267 A1 Apr. 4, 2002

(30) Foreign Application Priority Data
Oct. 3, 2000 (JP) ........................................ 2000-303533

(51) Int. Cl.$^7$ .............................. G06F 7/00; B60K 41/02
(52) U.S. Cl. ............................. 701/51; 701/58; 477/78
(58) Field of Search .............................. 701/50, 51, 52, 701/56, 58, 62, 64; 477/70, 78, 95

(56) References Cited

U.S. PATENT DOCUMENTS 6,070,117 A * 5/2000 Yamada et al. ............... 701/50

* cited by examiner

Primary Examiner—William A. Cuchlinski, Jr.
Assistant Examiner—Edward Pipala
(74) Attorney, Agent, or Firm—Burns, Doane, Swecker & Mathis, LLP

(57) ABSTRACT

A transmission system, including a synchromesh-type transmission, includes an input shaft, a counter gear, an output shaft, an idle gear, a sleeve, a synchromesh mechanism for selecting a predetermined speed-change in response to a synchronizing operation of the sleeve and the idle gear, and a shift actuator for activating the sleeve depending on a shift operation. The transmission system further includes a detecting device for detecting a rotational number changing ratio of the input shaft when a synchronizing operation is performed in accordance with an engaging operation of the sleeve and the idle gear, a controlling device for controlling an operation of the shift actuator depending on an indication from the detecting device, and a converting device for converting an output indicating value to the shift actuator based on characteristics of the shift actuator.

19 Claims, 8 Drawing Sheets

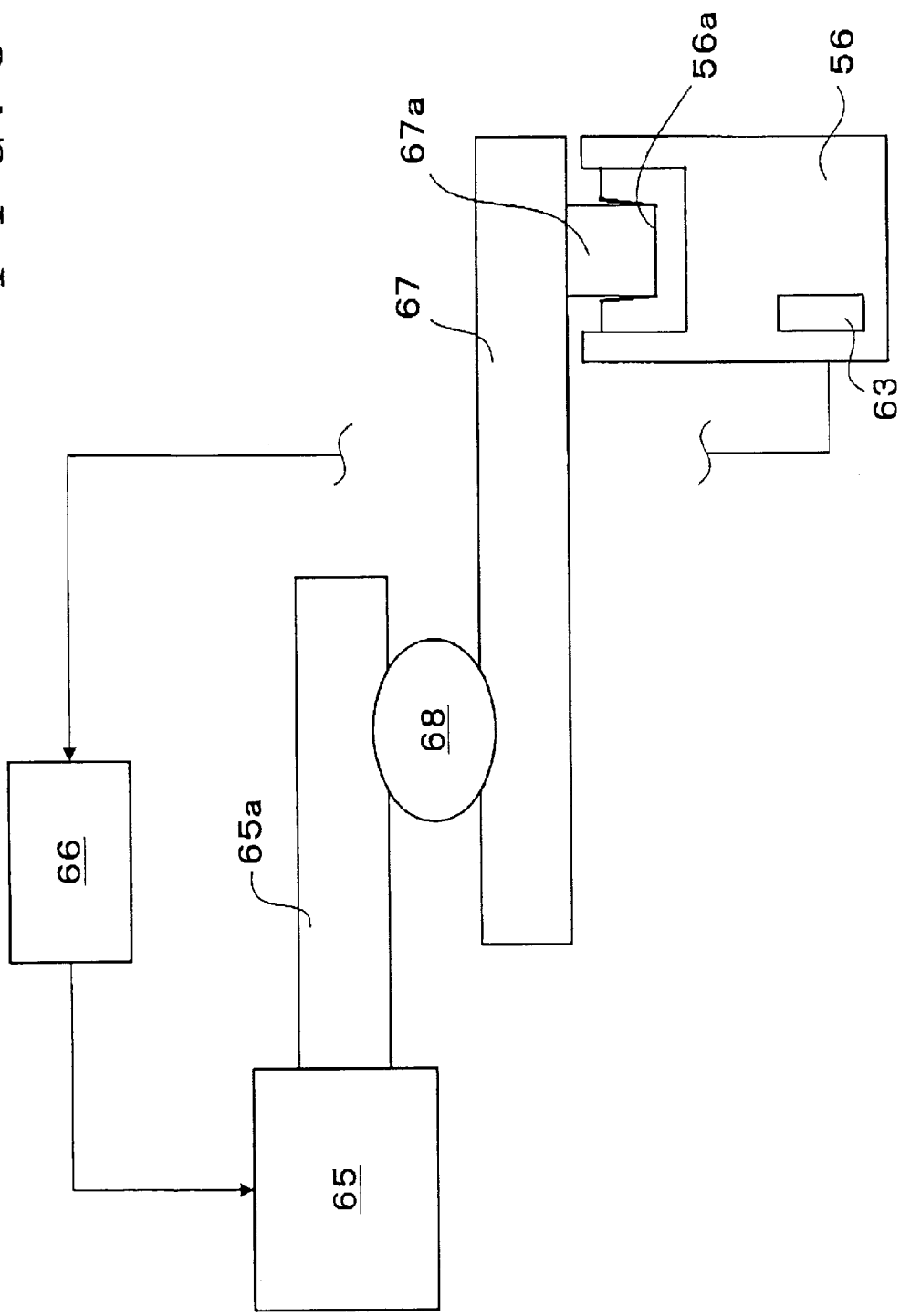

CONTROL DEVICE APPLIED IN A SYNCHROMESH-TYPE TRANSMISSION

This application is based on and claims priority under 35 U.S.C. §119 with respect to Japanese Patent Application 2000-303533, filed on Oct. 3, 2000, the entire content of which is incorporated herein by reference.

1. Field of the Invention

This invention generally relates to a control device which is applied in a synchromesh-type transmission for a vehicle. More particularly, this present invention pertains to a control device which is applied in a synchromesh-type transmission provided with a sleeve activated by a shift actuator in response to a shift operation. This invention further relates to a control device which controls operation of a shift actuator.

2. Background of the Invention

Vehicles such as passenger cars, buses and the like are generally driven by a driving power source such as a gasoline engine or an electric motor. The vehicle is provided with a transmission for producing a preferable vehicle driving condition in response to a vehicle running road condition. The transmission is for selecting gears, for meshing the selected gears with each other, and for changing the gears to be selected, to generate a desired torque or speed. As is well known, transmission types include a manual transmission (MT) and an automatic transmission (AT) in which a speed-change gear and a timing of speed-change are automatically selected.

As shown in FIG. 7, a known manual transmission (MT) is mainly formed as an input shaft 51, a plurality of counter gears 52, an output shaft 53, a plurality of idle gears 61, and a synchromesh mechanism 55 including a sleeve 56. The input shaft 51 is supplied with driving force from the driving power source such as the gasoline engine. The plurality of counter gears 52, are mounted on the input shaft 51. The output shaft 53 outputs driving force to vehicle wheels (not shown) via a propeller shaft (not shown). The plurality of idle gears 61 are idly mounted on the output shaft 53 and always meshes with the counter gears 52, respectively.

According to the vehicle provided with the known manual transmission, a predetermined speed-change gear is selected based on a manual shift operation by a driver. As shown in FIG. 8, upon the manual shift operation of a shift lever (not shown) by the driver, a shift fork shaft 67 (shown in FIG. 8) is moved by a shift operating force transmitted from the shift lever via a cable. Further, corresponding to the movement of the shift fork shaft 67, the sleeve 56 is moved, wherein one of the idle gears 61 meshes with the output shaft 53 as a unit.

Somewhat recent developments have led to an automatic manual transmissions which are structurally based on the manual transmission (MT). As shown in FIG. 8, the automatic manual transmission performs the shift operation by a shift actuator 65 which is made of, for example, a hydraulic pressure motor or a hydraulic pressure cylinder. Therefore, the automatic manual transmission effectively relieves a manual operating load from the diver. The shift lever (not shown) is operated to transmit the driver's intention of speed-change and a timing of speed-change to an electronic control unit ECU 66. The ECU 66 controls the timing and the amount to activate the shift actuator 65.

The output from the shift actuator 65 is transmitted to the shift fork shaft 67 via a driving portion 65a (an output shaft of the shift actuator 65) and a shift fork shaft operating device 68 (formed as an inner lever, an interlock plate, and a shift head). Immediately after the shift actuator 65 is activated, the shift fork shaft 67 is axially moved via the shift fork shaft operating device 68. The sleeve 56 is integrally moved with the shift fork shaft 67 by an engagement between a projecting portion 67a of the shift fork shaft 67 and an engaging groove 56a defined in the sleeve 56, According to the known aforementioned automatic manual transmission, when the shift fork shaft 67 and the sleeve 56 are moved by the output from the shift actuator 65 via the shift fork shaft operating device 68 upon a synchronizing operation being performed, it is very important to determine the amount of driving force the shift actuator 65 applied to the sleeve 56. More specifically, as shown in FIG. 7, the sleeve 56 is meshed with splines defined in a synchronizer hub 57. The synchronizer hub 57 is rotated integrally with the output shaft 53. When the driving force is applied to the sleeve 56, a synchronizer key 58 is engaged with the sleeve 56 and moved therewith. An edge surface of the synchronizer key 58 pushes a synchronizer ring 59 against a cone portion of the idle gear 61. Accordingly, the rotation of the idle gear 61 is gradually synchronized with the rotation of the sleeve 56.

According to further movement of the sleeve 56, the sleeve 56 is disengaged from the synchronizer key 58 and directly pushes the synchronizer ring 59. The rotational speed of the idle gear 61 becomes equal to the rotational speed of the sleeve 56 due to frictional engagement between the synchronizer ring 59 and the idle gear 61, i.e. the idle gear 61 is synchronized with the sleeve 56. Hereinafter, the synchronizer ring 59 is rotated independently and does not hinder the sleeve 56 from moving. Therefore, the sleeve 56 passes through the synchronizer ring 59 and is engaged with the idle gear 61, wherein the shift operation is completed.

If the driving force transmitted from the shift fork shaft 67 to the sleeve 56 is far larger than a desired amount, the synchronizer ring 59 and/or an inclined surface of the cone portion of the idle gear 61 may be damaged due to excess friction, thereby deteriorating durability of the idle gear. On the other hand, if the driving force transmitted from the shift fork shaft 67 to the sleeve 56 is far smaller than the desired amount, more time is required to perform the synchronizing operation between the sleeve 56 and the idle gear 61. Furthermore, a reliable synchronizing operation may not occur. To overcome the aforementioned drawbacks, the amount of the driving force applied to the sleeve 56 via the shift fork shaft 67 has to be effectively controlled by the shift actuator 65, so that the synchromesh mechanism 55 may operate with higher durability and with a shorter synchronizing time.

In view of the above, according to the known automatic manual transmission, a load detecting sensor 63 is mounted on the sleeve 56 as shown in FIG. 8. The load detecting sensor 63 detects the driving force applied to the sleeve 56. The detected value by the load detecting sensor 63 is transmitted to the ECU 66, so that the driving force from the shift actuator 65 is controlled based on the detected value. However, extra time may be required for installing the sensor 63 and an extra load may be placed on the sleeve 56. Further, manufacturing cost will increase for mounting the load detecting sensor 63 on the sleeve 56.

According to the known automatic manual transmission, an output indicating value which is input to the shift actuator 65 is detected. If the shift actuator 65 is made of a hydraulic pressure motor, the output indicating value is an electric current value supplied to a coil. If the shift actuator 65 is made of a hydraulic pressure cylinder, the output indicating value is an electric current value supplied to a solenoid valve. However, even when the output indicating value is properly detected, a desired driving force may not be generated by only detecting the output indicating value, due to resistance and friction within the shift actuator 65. Therefore, in addition to the detection of the output indicating value, a rotational number of a rotating portion of the hydraulic pressure motor or a stroke of a piston included in the hydraulic pressure cylinder is detected. However, it may be difficult to detect the output indicating value and to detect the rotational number of the hydraulic pressure motor or the stroke of the piston included in the hydraulic pressure cylinder.

As described above, certain improvements are desirable for the above known automatic manual transmission for the vehicle such as providing an improved control device applied in a synchromesh-type transmission that can determine the driving force applied from the shift actuator 65 to the sleeve 56 without detecting the actual driving force by a load detecting sensor 63 and the like in order to reduce manufacturing time and cost while not causing damage to the synchromesh mechanism 55.

SUMMARY OF THE INVENTION

A transmission system, including a synchromesh-type transmission, includes a) an input shaft rotated corresponding to driving power from a driving power source, b) an idle gear mounted on the input shaft, c) an output shaft applied with the driving power from the input shaft, d) a counter gear mounted on the output shaft and meshed with the idle gear, e) a sleeve rotated with the input shaft and moved in an axial direction of the input shaft, f) a synchromesh mechanism for selecting a predetermined speed-change in response to a synchronizing operation of the sleeve and the idle gear, and g) a shift actuator for activating the sleeve depending on a shift operation. The transmission system further includes h) a detecting means for detecting an angular speed or an angular acceleration of the input shaft when a synchronizing operation is performed in accordance with an engaging operation of the sleeve and the idle gear and i) a controlling means for controlling an operation of the shift actuator depending on an indication from the detecting means. The transmission system further includes a converting means for converting an output indicating value to the shift actuator based on characteristics of the shift actuator.

BRIEF DESCRIPTION OF THE DRAWINGS

The foregoing and additional features and characteristics of the present invention will become more apparent from the following detailed description considered with reference to the accompanying figures in which like reference numerals designate like elements.

FIG. 8 is a schematic block view illustrating an entire transmission system including the known synchromesh-type transmission.

DETAILED DESCRIPTION OF THE INVENTION

A synchromesh-type transmission, for a vehicle in accordance with embodiments of the present invention, is mainly formed as an input shaft, an output shaft, and a synchromesh mechanism. A plurality of idle gears are idly mounted on the input shaft. A plurality of counter gears are mounted on the output shaft.

The synchromesh mechanism includes a sleeve which is rotatable with the input shaft and is movable in an axial direction of the input shaft. The synchromesh mechanism further includes a synchronizer ring disposed on both sides of the sleeve.

A control device includes a shift actuator, a detecting means for detecting an angular speed or an angular acceleration, a converting means, and a controlling means. The shift actuator is made of, for example, a hydraulic pressure motor or a hydraulic pressure cylinder. An inner lever, an interlock plate, and a shift head are disposed between the shift actuator and the sleeve.

According to the first embodiment of the present invention, the detecting means detects an angular speed of the input shaft or an angular acceleration thereof. For example, the angular speed of the input shaft or the angular acceleration thereof is detected by an angular speed or an angular acceleration detecting sensor disposed adjacent to the input shaft. The detected angular speed is differentiated by a length of time and is transferred to the controlling means as an angular acceleration. Alternatively, the angular speed can be differentiated by the length of time after being transferred to the controlling means.

According to the second embodiment of the present invention, the converting means converts an output indicating value, which is input to the shift actuator, to a conversion indicating value based on characteristics of the shift actuator. The output indicating value is an electric current value or a voltage value which excites a coil when the actuator is a hydraulic pressure motor or which actuates a hydraulic pressure regulating valve or a fluid flow regulating valve when the actuator is a hydraulic pressure cylinder. These aforementioned values are measured by an ampere meter or a voltmeter, respectively.

Figure 4:
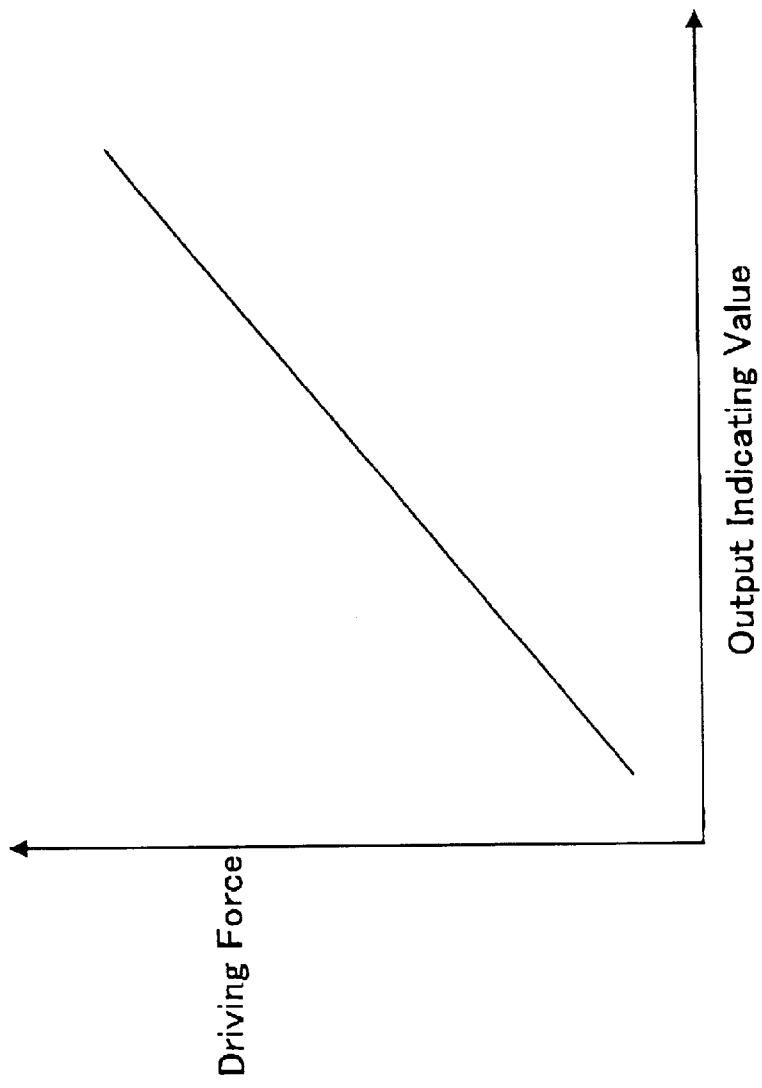
FIG. 4 is a graph illustrating a relationship between an output indicating value input to a shift actuator and a driving force of the shift actuator according to the embodiments of the present invention.

Characteristics of the shift actuator are calculated based on a coefficient C which is obtained from a relationship between the output indicating value transmitted to the shift actuator and an actual output driving force from the shift actuator (see FIG. 4). The value of the coefficient C is obtained by an actual measurement or by a predetermined calculation and is varied to be larger than a value 1 or smaller than the value 1. Accordingly, a more reliable output driving force from the shift actuator may be obtained. The conversion indicating value is transmitted to the controlling means.

The controlling means controls the output driving force from the shift actuator. According to the first embodiment of the present invention, the controlling means controls the output driving force based on an indication by the detecting means for detecting the angular speed or the angular acceleration. According to the second embodiment of the present invention, the controlling means controls the output driving force based on an indication by the converting means.

More specifically, according to the first embodiment, when the angular speed or the angular acceleration detected by the detecting means, is larger than a predetermined value, the output driving force from the shift actuator is reduced. When the detected angular speed or the detected angular acceleration is smaller than the predetermined value, the output driving force from the shift actuator is increased. According to the second embodiment, the controlling means controls the operation of the shift actuator at a larger or smaller indicating value than the output indicating value based on the conversion indicating value converted by the converting means.

According to the first embodiment of the present invention, in addition to the above explained controlling means, the controlling means further detects an angular speed or an angular acceleration of the input shaft generated by dragging. As one of the variations of the first embodiment, the controlling means further includes a first correcting means for correcting the angular speed or the angular acceleration of the input shaft detected by the detecting means. The angular speed or the angular acceleration of the input shaft is corrected by using the angular speed or the angular acceleration of the input shaft generated by dragging. Dragging may occur when the counter gears mix lubricating oil stored in a casing of the transmission upon rotation of the input shaft. Dragging decreases the angular speed or the angular acceleration of the input shaft activated by the shift actuator. Therefore, a more accurate detection of the angular speed or the angular acceleration of the input shaft is determined by subtracting the angular speed or the angular acceleration of the input shaft generated by dragging from the angular speed or the angular acceleration of the input shaft detected by the detecting means.

Figure 3:
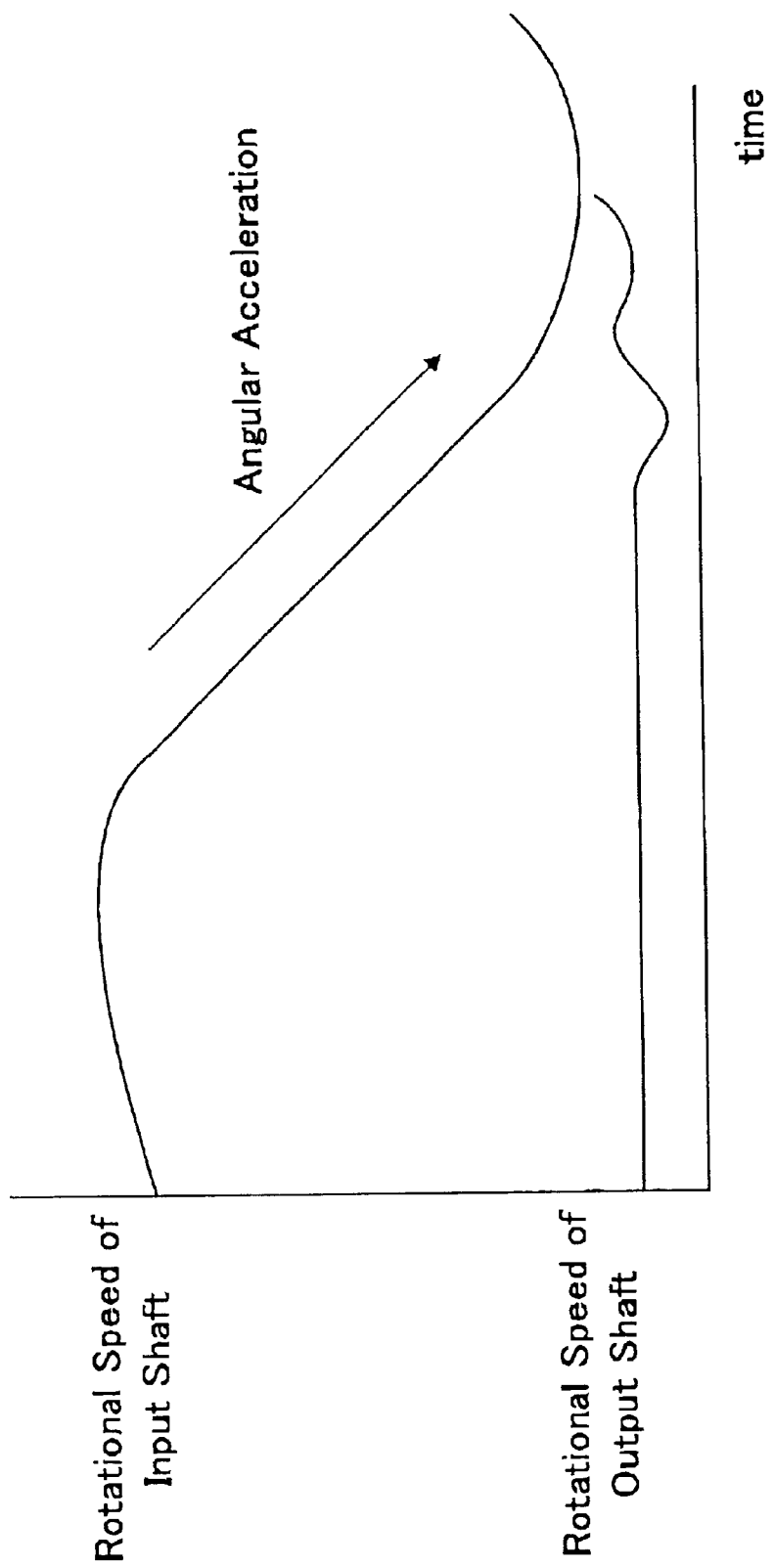
FIG. 3 is a graph illustrating a relationship between a rotational number of an input shaft and a rotational number of an output shaft according to the embodiments of the present invention.
Figure 5:
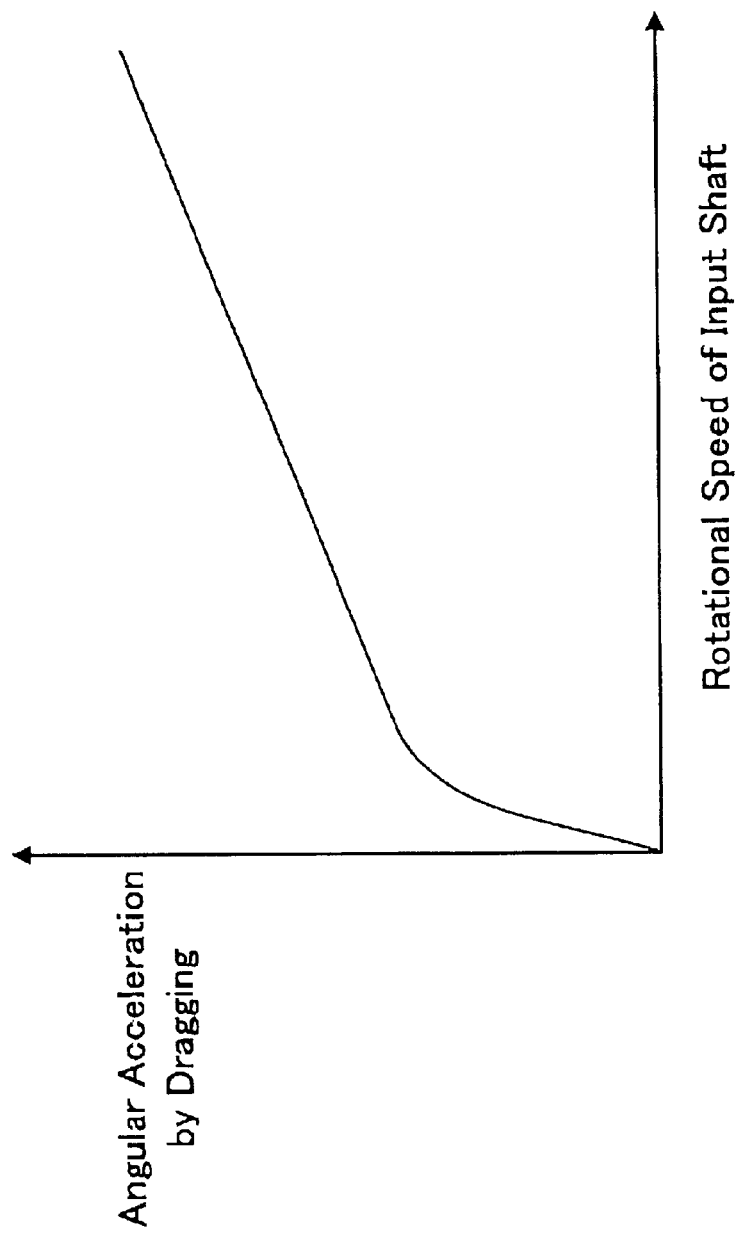
FIG. 5 is a graph illustrating a relationship between the rotational number of the input shaft and an angular acceleration by dragging according to the embodiments of the present invention.

For example, the angular speed or the angular acceleration of the input shaft generated by dragging is detected, for example, by employing any of the following procedures:

The angular speed or the angular acceleration of the input shaft generated by dragging is varied depending on the rotational speed of the input shaft or depending on a rotational speed of the input shaft relative to the output shaft. In other words, when the driving force is applied to the sleeve, the synchronizer ring is pushed against the cone portion of the idle gear. Corresponding to friction between the synchronizer ring and the idle gear, the rotational speed of the idle gear is synchronized with the rotational speed of the sleeve. That is, as shown in FIG. 3, the angular speed or the angular acceleration of the input shaft is synchronized with the angular speed or the angular acceleration of the output shaft. Generally, when the rotational speed of the input shaft is smaller than a predetermined value, the angular speed or the angular acceleration of the input shaft is rapidly increased and hereupon increased at a slow speed. As shown in FIG. 5, if the relationship between the angular speed or the angular acceleration of the input shaft generated by dragging and the rotational speed of the input shaft is predetermined by a map or table, the angular speed or the angular acceleration of the input shaft generated by dragging is easily determined corresponding to the rotational speed of the input shaft.

Alternatively, the angular speed or the angular acceleration of the input shaft generated by dragging is varied depending on a position of a shift lever. When the shift lever is set at a neutral position, all the sleeves are set at the neutral position, i.e. all the sleeves are not engaged with any speed-change gears, wherein any speed-change is not performed. "Being set at the neutral position" according to the present invention includes, for example, a) when the shift lever is shifted from a selected speed-change gear to the neutral position and b) when the shift lever is shifted from the selected speed-change gear to any of the other speed-change gears. When the shift lever is set at the neutral position, no friction and resistance are applied to the synchromesh mechanism. Therefore, the angular speed or the angular acceleration of the input shaft by dragging is properly measured by a sensor upon the rotation of the input shaft.

As another one of the variations of the first embodiment, the control device further includes a second correcting means for correcting the angular speed or the angular acceleration detected by the detecting means. The angular speed or the angular acceleration is corrected based on a coefficient B obtained by a predetermined calculation, for example, a frictional force generated by each synchromesh mechanism. For example, the frictional force can be gradually increased and can be set corresponding to the shift operation from a lower speed-change gear to a higher speed-change gear.

According to the second embodiment of the present invention, as one of the variations of the second embodiment, the control device further includes a third correcting means for correcting the conversion indicating value. The conversion indicating value is corrected based on a coefficient D obtained by a predetermined calculation, for example, a transmitting efficiency of the output driving force from the shift actuator to the sleeve. The coefficient D is obtained by multiplying, for example, a speed reducing ratio, the transmitting efficiency, a shift lever ratio and is varied to be larger than a value 1 or smaller than the value 1. Hereinafter, "transmitting efficiency" represents a ratio of an output at the sleeve relative to an input at the shift actuator. For example, if the input 1 to the shift actuator is transmitted to the sleeve by the transmitting efficiency 0.8, the output from the sleeve becomes 0.8. When the shift actuator is a hydraulic pressure motor and the driving force transmitting portion are gears, the transmitting efficiency is determined in accordance with bearings of the shafts or friction of the gear teeth. When the shift actuator is the hydraulic pressure cylinder and the driving force transmitting portion is a hydraulic pressure conduit, the transmitting efficiency is determined in accordance with hydraulic pressure loss.

An actual load applied to the sleeve is a reaction force axially applied to the sleeve from the synchronizer ring and/or the idle gear upon a movement of the sleeve. When the driving force (output) of the sleeve is estimated based on the output indicating value, it is preferable to consider a sleeve stroke (a predetermined stroke range) and a sleeve moving speed (lower than a predetermined speed) for improving reliability of the driving force (output) of the sleeve.

Figure 1:
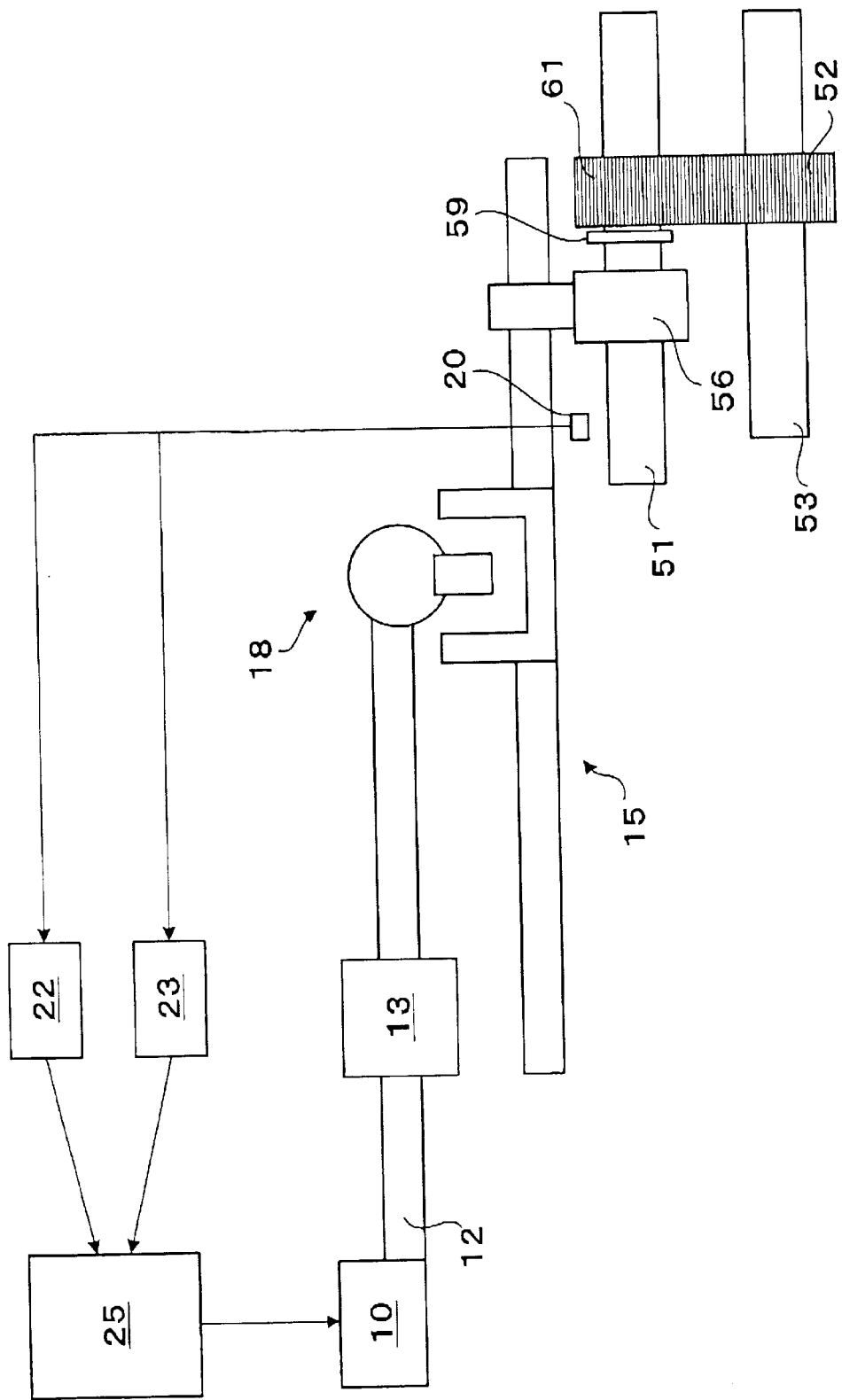
FIG. 1a schematic block view illustrating an entire transmission system including a synchromesh-type transmission according to a first embodiment of the present invention.

Referring to the drawing figures, a further description of the present invention will now be set forth. FIG. 1 schematically illustrates an entire transmission system including the synchromesh-type transmission according to the first embodiment of the present invention.

The synchromesh-type transmission includes an input shaft 51, an output shaft 53, and a synchromesh mechanism including a sleeve 56. A plurality of idle gears 61 are idly mounted on the input shaft 51. A plurality of counter gears 52 are mounted on the output shaft 53. The control device used in the synchromesh-type transmission includes a hydraulic pressure cylinder 10, a driving shaft 12 (an output shaft of the hydraulic pressure cylinder 10), a shift fork shaft 15, an angular speed detecting sensor 20, an electronic control unit ECU 25, a first correcting means 22, and a second correcting means 23. The hydraulic pressure cylinder (the shift actuator) 10 is connected to the driving shaft 12 which is moved in an axial direction thereof. A reduction gear 13 is disposed on the driving shaft 12. The shift fork shaft 15 is axially movably disposed parallel to the driving shaft 12. A projecting portion of the shift fork shaft 15 is engaged with an engaging portion of the sleeve 56. A shift fork shaft operating device 18 (formed as an inner lever, an interlock, and a shift head) is disposed between the driving shaft 12 and the shift fork shaft 15. An axial movement of the driving shaft 12 is transmitted to the shift fork shaft 15 via the shift fork shaft operating device 18.

The angular speed detecting sensor 20 is disposed adjacent to the input shaft 51 and detects the angular speed of the input shaft 51. An angular acceleration of the input shaft 51 is calculated as a time differential of the rotational speed of the input shaft 51. Alternatively, the shaft acceleration could be measured directly by using an angular acceleration sensor. A value detected by the angular speed detecting sensor 20 is input to the first correcting means 22 and the second correcting means 23.

Figure 6:
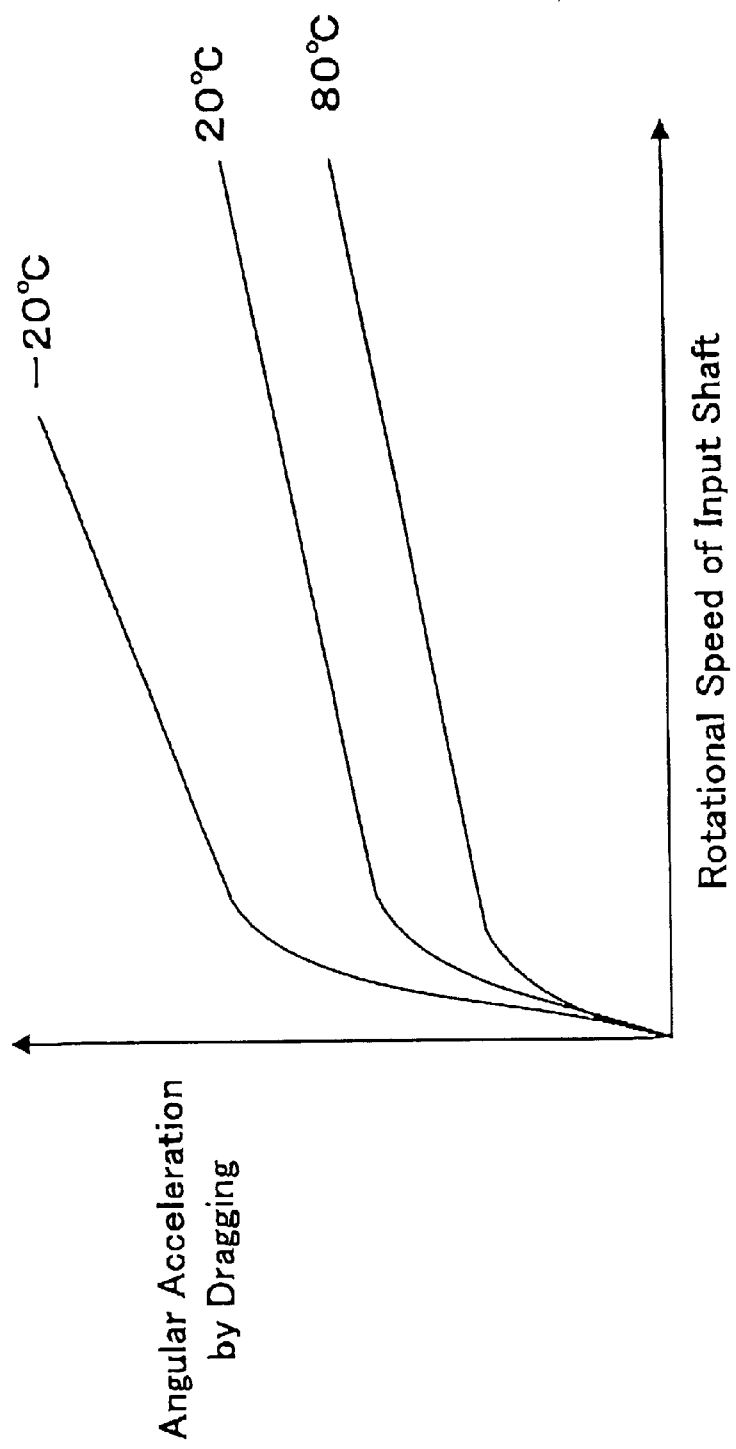
FIG. 6 is a graph illustrating a relationship between the rotational number of the input shaft and the angular acceleration by dragging corresponding to each temperature of a lubricating oil according to the first embodiment of the present invention.
Figure 7:
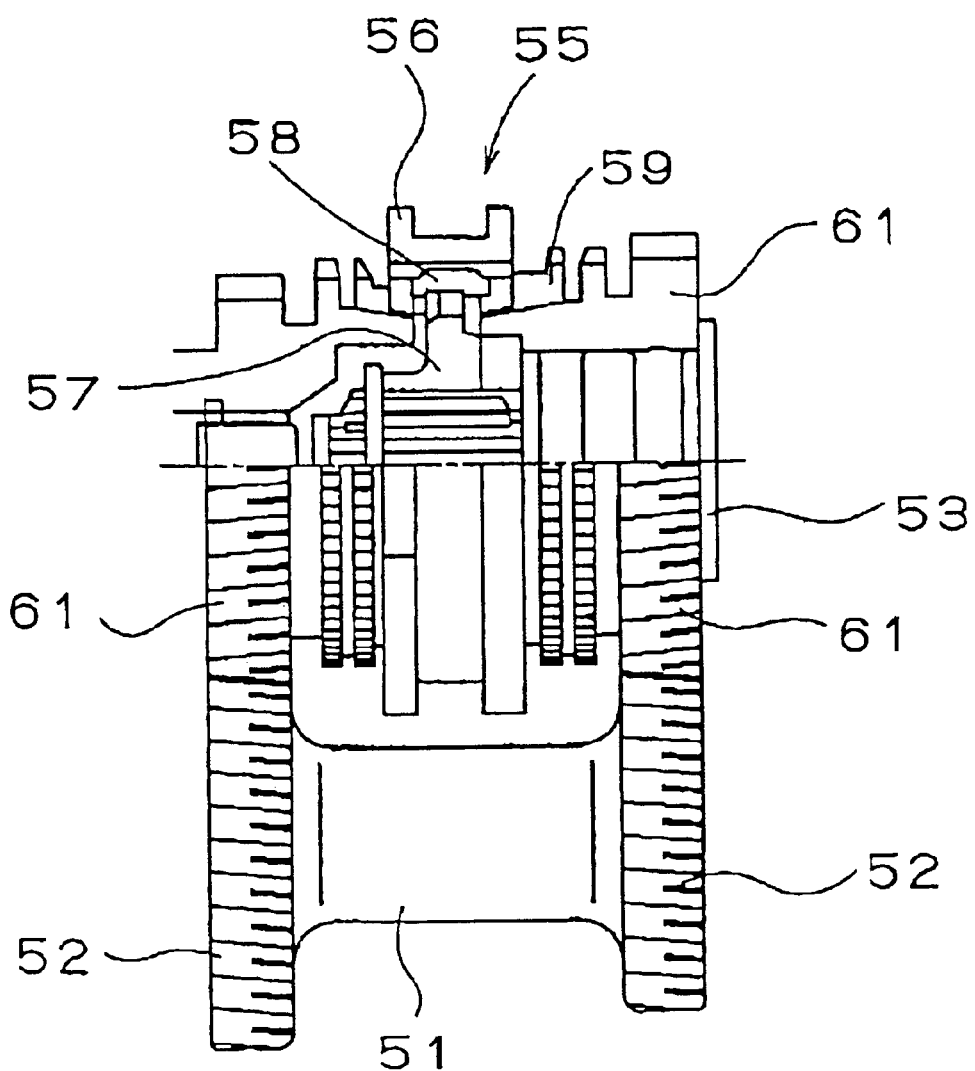
FIG. 7 is a front view (partially sectional view) illustrating a known synchromesh-type transmission.

According to the first correcting means 22, as shown in FIG. 6, the angular speed or the angular acceleration of the input shaft 51 generated by dragging is calculated corresponding to the rotational speed of the input shaft 51, based on a map showing the relationship between the rotational speed of the input shaft 51 and the angular acceleration of the input shaft 51 generated by dragging.

The less the rotational speed of the input shaft 51 is, the smaller the angular acceleration of the input shaft 51 generated by dragging is. The angular acceleration generated by dragging is gradually increased corresponding to an increase in the rotational speed of the input shaft 51. When a temperature of a lubricating oil is high, the angular acceleration of the input shaft 51 is low. The angular acceleration gradually becomes higher corresponding to dropping of the temperature of the lubricating oil. Each curved line shown in FIG. 6 shows the angular acceleration of the input shaft 51, generated by dragging corresponding to each temperature of the lubricating oil upon detecting the angular acceleration generated by dragging. Therefore, the angular acceleration generated by dragging is calculated corresponding to the rotational speed of the input shaft 51 based on the map shown in FIG. 6. As described above, according to the first correcting means 22, a corrected angular acceleration of the input shaft 51 is calculated by subtracting the angular acceleration generated by dragging from the angular acceleration detected by the angular speed detecting sensor 20 and then is input to the ECU 25.

According to the second correcting means 23, the angular acceleration of the input shaft 51 detected by the angular speed detecting sensor 20 is corrected on the basis of a gear specification. Hereinafter, "the gear specification" means a frictional force generated by engagement of the idle gear 61 with the counter gear 52 of each synchromesh mechanism. The gear specification is varied depending on each combination of the idle gear 61 and the counter gear 52 which produces each speed-change gear. Therefore, it is preferable that one table is prepared for the frictional force corresponding to each speed-change gear. For example, the frictional force is minimum at the shift operation for a first speed-change and is maximum at the shift operation for a fifth speed-change. That is, the frictional force is gradually increased corresponding to the shift operation from the first speed-change to the fifth speed-change. According to the second correcting means 23, a corrected angular acceleration is calculated by subtracting the angular acceleration corresponding to each speed-change gear from the angular acceleration detected by the angular speed detecting sensor 20.

The ECU 25 controls the operation of the shift actuator 10 based on the angular Jul acceleration corrected by the first correcting means 22 and the second correcting means 23 (i.e. based upon estimated load applied to the sleeve).

Figure 2:
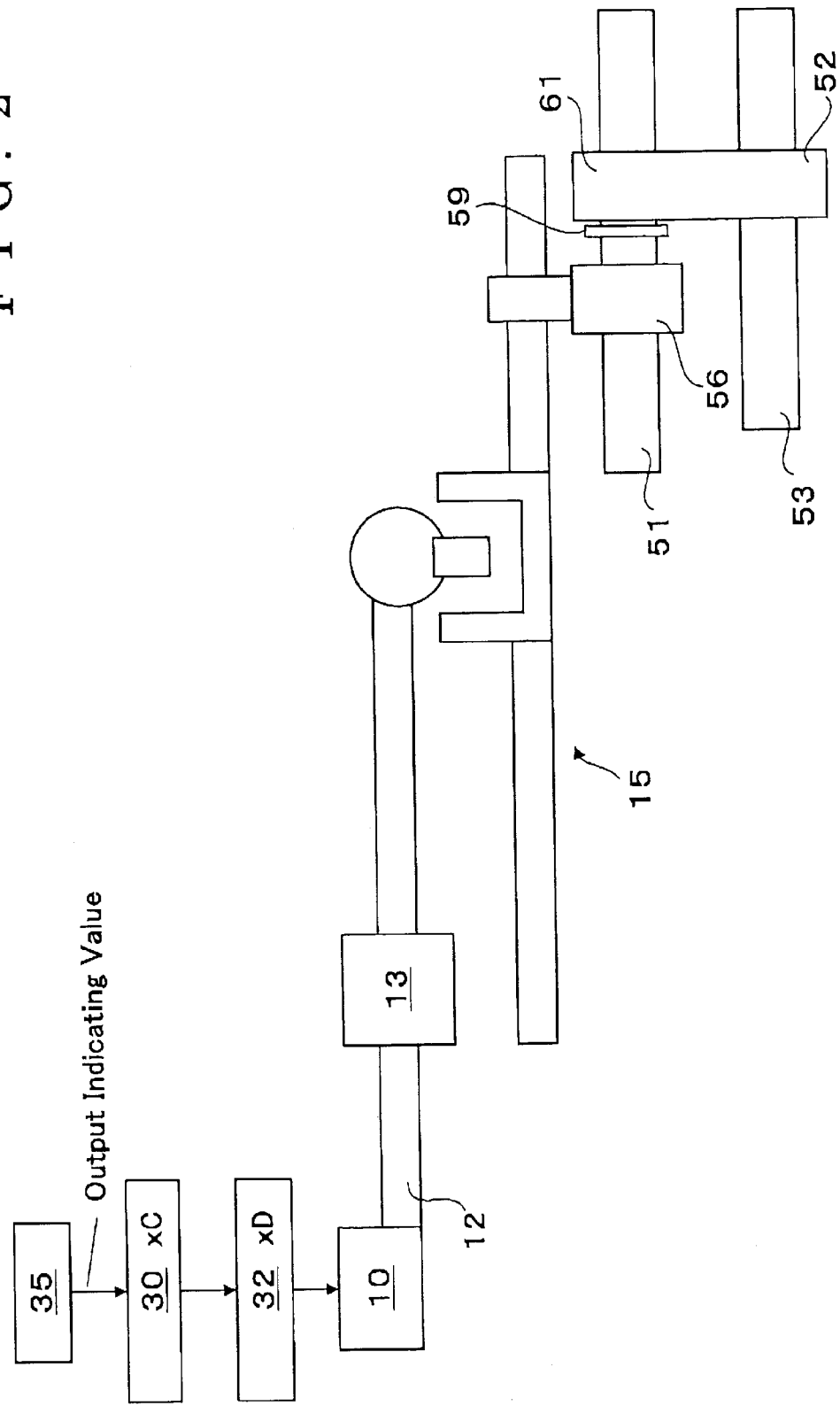
FIG. 2 is a schematic block view illustrating the entire transmission system including a synchromesh-type transmission according to a second embodiment of the present invention.

Referring to the figures, a further description of the present invention will now be set forth. FIG. 2 schematically illustrates the entire transmission system including a synchromesh-type transmission according to the second embodiment of the present invention.

The synchromesh-type transmission according to the second embodiment is identical to the synchromesh-type transmission according to the first embodiment is identical to the synchromesh-type transmission will be omitted for simplifying description of the second embodiment. The control device includes the hydraulic pressure cylinder 10, the driving shaft 12, the shift fork shaft 15, a converting means 30 (i.e. sleeve load estimating means), a third correcting means 32, and an electronic control unit ECU 35.

According to the converting means 30, an output indicating value, for example, an electric current value or an electric voltage value is input to a solenoid valve of the hydraulic pressure cylinder 10. The output indicating value is converted to a converted electric current value or a converted electric voltage value based on a predetermined coefficient C corresponding to characteristics of the hydraulic pressure cylinder 10. The converted electric current value or the converted electric voltage value is input to the third correcting means 32.

According to the third correcting means 32, the converted electric current value or the converted electric voltage value is corrected based on the transmitting efficiency of the driving force applied from the hydraulic pressure cylinder 10 to the sleeve 56. The transmitting efficiency is calculated, for example, by hydraulic pressure loss in the driving force transmitting portion of the hydraulic pressure conduit. The corrected electric current value or the corrected electric voltage value by the third correcting means 32 is input to the ECU 35. The ECU 35 controls an operation of the shift actuator 10 based on the corrected electric current value or the corrected electric voltage value, According to the second embodiment of the present invention, the output indicating value to the hydraulic cylinder 10 does not correspond to the driving force (output) of the sleeve 56 due to the hydraulic pressure loss in the hydraulic cylinder 10 or the transmitting efficiency of the driving force between the hydraulic cylinder 10 and the sleeve 56. The output indicating value input to the hydraulic cylinder 10 is converted and corrected by using the above-described features, for example, the hydraulic pressure loss or the transmitting efficiency. The hydraulic cylinder 10 is controlled based on the corrected output indicating value, i.e. the corrected electric current value or the corrected electric voltage value. Accordingly, the moving stroke of the driving shaft 12 is properly controlled. When a synchronizing operation is performed, the sleeve 56 is pressed against the synchronizer ring 59 and the idle gear 61 with a proper driving force.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit and scope of the present invention. Accordingly, it is expressly intended that all such variations, changes and equivalents which fall within the spirit and scope of the present invention as defined in the claims, be embraced thereby.

What is claimed is:

1. A transmission system for a vehicle including a synchromesh-type transmission, comprising:

an input shaft rotated corresponding to driving power from a driving power source;

an idle gear idly mounted on the input shaft;

an output shaft having a counter gear engaged with the idle gear and transmitting the driving power to a drive wheel;

a synchromesh mechanism including a sleeve rotatable with the input shaft and movable in an axial direction of the input shaft wherein a synchronizing operation is performed in accordance with an engaging operation of the sleeve and the idle gear;

a shift actuator for moving the sleeve depending on a shift operation;

a detecting means for detecting an angular speed or an angular acceleration of the input shaft when the synchronizing operation is performed in accordance with the engaging operation of the sleeve and the idle gear;

a sleeve load estimating means for estimating load applied to the sleeve based upon a detection signal by the detecting means; and a controlling means including said sleeve load estimating means, said controlling means for controlling an operation of the shift actuator based upon the estimated load applied to the sleeve.

2. The transmission system for a vehicle including a synchromesh-type transmission according to claim 1, wherein the controlling means further includes a first correcting means for correcting the angular speed or the angular acceleration of the input shaft based on dragging applied to the input shaft, wherein the sleeve load estimated by the sleeve load estimating means is corrected.

3. The transmission system for a vehicle according to claim 2, wherein a corrected angular speed or a corrected angular acceleration is determined based upon the angular speed or the angular acceleration generated by dragging and angular acceleration detected by the detecting means.

4. The transmission system for a vehicle including a synchromesh-type transmission according to claim 1, wherein the controlling means further includes a first correcting means for correcting the angular speed or the angular acceleration of the input shaft based on dragging applied to the input shaft corresponding to temperature of a lubricating oil in the transmission, wherein the sleeve load estimated by the sleeve load estimating means is corrected.

5. The transmission system for a vehicle including a synchromesh-type transmission according to claim 1, wherein the controlling means further includes a second correcting means for correcting the angular speed or the angular acceleration of the input shaft in accordance with a frictional force generated by the synchromesh mechanism, wherein the sleeve load estimated by the sleeve load estimating means is corrected.

6. The transmission system for a vehicle according to claim 5, wherein the frictional force is generated by engagement of the idle gear with the counter gear.

7. The transmission system for a vehicle according to claim 5, wherein the frictional force varies depending upon each shift operation.

8. The transmission system for a vehicle according to claim 5, wherein a corrected angular speed or a corrected angular acceleration is determined based upon an angular speed or an angular acceleration corresponding to each shift operation and angular acceleration detected by the detecting means.

9. The transmission system for a vehicle according to claim 1, wherein the shift actuator is a hydraulic pressure cylinder or a hydraulic pressure motor.

10. The transmission system for a vehicle according to claim 1, wherein the controlling means controls the operation of the shift actuator based upon the angular speed or the angular acceleration of the input shaft corrected by dragging and frictional force.

11. The transmission system for a vehicle according to claim 1, wherein the detecting means for detecting the angular speed or the angular acceleration of the input shaft is an angular speed detecting sensor.

12. A transmission system for a vehicle including a synchromesh-type transmission, comprising:

an input shaft rotated corresponding to driving power from a driving power source;

an idle gear mounted on the input shaft;

an output shaft having a counter gear engaged with the idle gear and transmitting the driving power to a drive wheel;

a synchromesh mechanism including a sleeve rotatable with the input shaft and movable in an axial direction of the input shaft for selecting a predetermined speed-change in response to a synchronizing operation of the sleeve and the idle gear;

a shift actuator for moving the sleeve depending on a shift operation;

a sleeve load estimating means for estimating load applied to the sleeve by converting an output indicating value of the shift actuator to a converted indicating value based on characteristics of the shift actuator; and a controlling means for controlling an operation of the shift actuator in response to the estimated load applied to the sleeve.

13. The transmission system for a vehicle including a synchromesh type transmission according to claim 12, wherein the controlling means further includes a correcting means for correcting the converted indicating value based on transmitting efficiency of driving force from the shift actuator to the sleeve, wherein the sleeve load estimated by the sleeve load estimating means is corrected.

14. The transmission system for a vehicle according to claim 13, wherein transmitting efficiency is a ratio of an output at the sleeve relative to an input at the shift actuator.

15. The transmission system for a vehicle according to claim 13, wherein the shift actuator is a hydraulic pressure cylinder, and the transmitting efficiency is based upon hydraulic pressure loss.

16. The transmission system for a vehicle according to claim 13, wherein the driving force is based upon a sleeve stroke and a sleeve moving speed.

17. The transmission system for a vehicle including a synchromesh-type transmission according to claim 12, wherein the characteristics of the shift actuator is determined based on a relationship between the output indicating value transmitted to the shift actuator and an actual output driving force from the shift actuator.

18. The transmission system for a vehicle according to claim 12, wherein the output indicating value is an electric current value or electric voltage value input to the shift actuator.

19. The transmission system for a vehicle according to claim 12, wherein said shift actuator is a hydraulic pressure motor or a hydraulic pressure cylinder.

* * * * *